June 16, 1953  H. W. POE  2,641,862
FISH LURE
Filed March 7, 1947
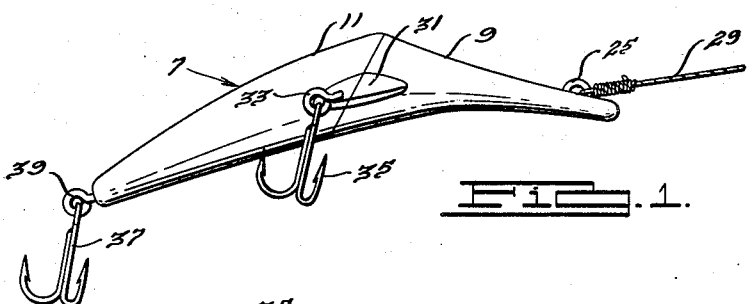
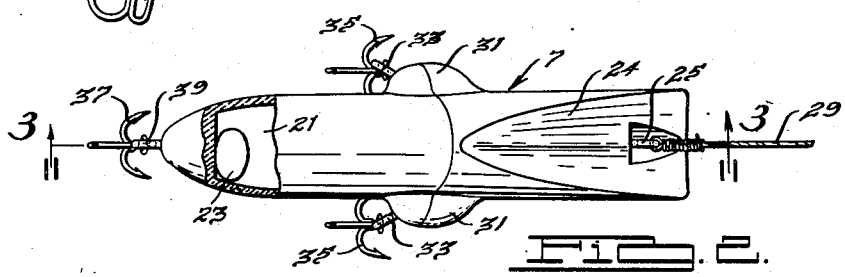
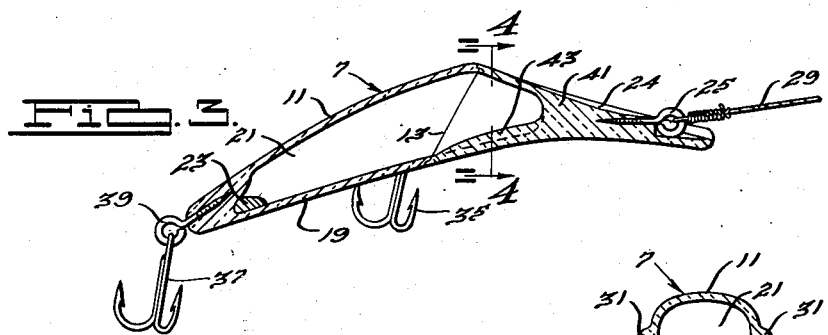
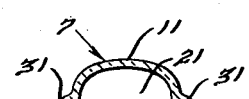
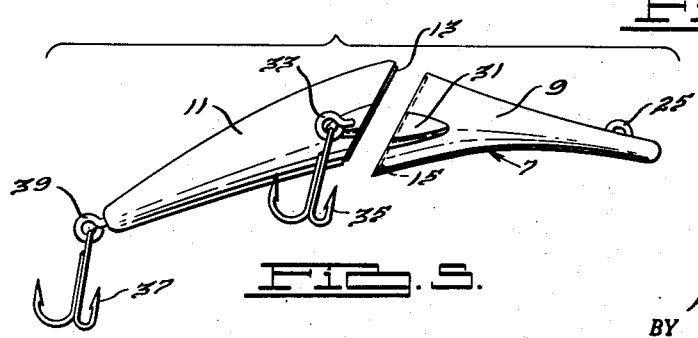
INVENTOR.
Howard W. Poe.
BY
Barnes, Dickey & Pierce.
ATTORNEYS.

Patented June 16, 1953

2,641,862

UNITED STATES PATENT OFFICE 2,641,862

FISH LURE

Howard W. Poe, Detroit, Mich., assignor to Lawrence W. Westerville, Grosse Pointe, Mich.

Application March 7, 1947, Serial No. 733,165

4 Claims. (Cl. 43—42.31)

This invention relates to fish lures, and particularly to a fish lure having a hollow interior containing shiftable means for controlling the movement of the lure.

The present invention constitutes an improvement over the applicant's patent application, Serial No. 659,253, filed April 3, 1946, and combines with a body of predetermined shape, shiftable means on the interior thereof which additionally controls the lure movement. This shiftable material may be particles of weight material or may be a liquid such as mercury which freely shifts from one end to the other of the lure and from side to side thereof. The lure body is preferably arched from the rear to the forward end so as to cause the weight material to shift either to the forward or rearward end of the lure body while the material, when shifted to the forward portion of the body, is always directed to one or the other side of the center line thereof.

The head of the body is preferably constructed to provide a planing surface which causes the lure to tend to dive downwardly so that after the lure is cast into the water, it is drawn forwardly and the body will tend to dive, the depth of the dive being controlled by the speed with which the lure is drawn through the water. As the lure assumes diving position, the shiftable material will pass to the forward end of the lure body at one side or the other thereof which will cause the body to turn slightly on its side. The pull on the line and the action of the planing head on the forward end of the body will cause the body to move upwardly and sidewardly, and the material will then shift to the rear. As soon as the material has shifted to the rear, the lure will again assume a substantially horizontal position. Thereafter, as the lure is pulled through the water, the body will again assume a diving position, causing the material to move to the forward end of the body. This movement will tend to cause the weight material to move to the opposite side of the body so that the lure will turn on its opposite side to again cause the lure to travel in an upward spiral path, and the material to shift to the rear of the body to cause the body to return substantially to a normal horizontal position. This spiraling or wiggling movement of the body is produced by the shifting of the weight material from one to the other end of the body and to the sides thereof as the lure is drawn at a constant speed through the water. The amount and speed of the darting and spiraling movement of the body may be regulated by the speed of movement of the lure, which may be varied as the lure is drawn through the water.

Planing vanes may be provided on the outside of the body intermediate the ends thereof to cooperate with the planing surface at the head end for preventing too abrupt diving of the lure when the weight is passed to the forward part of the body. These planing vanes are preferably arched in the same manner as the body is itself, and sets of hooks are secured to each of them so as to to balance the weight on both sides of the longitudinal center line thereof. The hooks are disposed below the center of gravity of the body to retain the planing surface of the head position pointed upwardly when the lure is in the water.

Accordingly, the main objects of this invention are: to provide a fish lure of novel construction and movement produced by shiftable material within the hollow interior of the lure body; to provide a lure made from a body having a planing head and a rearward portion arched downwardly and having in the hollow interior thereof a shiftable material by which the movement of the lure is controlled when drawn through the water; to construct a lure from two molded shells of translucent material of different colors, one of which shells forms the head or forward portion of the body and the other of which forms the arched rearward portion thereof so that each shell may be easily molded and removed from the molding dies; to construct a fish lure from two molded shells of the aforementioned type which are sealed together to provide a hollow interior in which a shiftable material is disposed and which is free to move to any point in the interior for controlling the movement of the lure in combination with planing surfaces provided thereon; to provide planing vanes on opposite sides of the body, one-half of each of which is formed on each of the aforementioned molded shells and which are arched in a manner similar to the body itself; to provide planing vanes of the aforementioned character having hooks secured thereto; to provide rib means adjacent the forward end of the body to direct the movement of the shiftable material to one side or the other of the forward end of the body; and, in general to provide a fish lure which is simple in construction, which has a multiplicity of variable movements and which is economical to manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a fish lure embodying features of this invention;

Fig. 2 is a top plan view of the structure illustrated in Fig. 1;

Fig. 3 is a sectional view of the structure illustrated in Fig. 2, taken along the line 3—3 thereof;

Fig. 4 is a sectional view of the structure illustrated in Fig. 3, taken along the line 4—4 thereof; and Fig. 5 is an exploded elevational view of the two molded sections of the lure of this invention.

The fish lure 7 comprises, as can be seen in Fig. 5, a hollow head portion 9 and a hollow rear arched portion 11. Each of these portions is molded preferably of a translucent material, painted so as to give a lifelike appearance. Due to the shape of each of the portions, they can be easily removed from the molding dies and thereby provide a simple inexpensive means for forming the same. The engaging ends of the head portion 9 and the rearward portion 11 may be constructed in any suitable manner, but in the embodiment illustrated herein, one end of each portion is open and has an edge in a plane other than at a right angle to the longitudinal axis of that portion. Further, the rearward portion 11 is provided with a circumferential flange 13 on its forward end which is of a smaller diameter than the outer periphery of the molded section 11 itself. The head portion 9 is provided with an annular groove 15 adapted to receive the flange 13 of the rear portion so that when the two portions are assembled they will be suitably interengaged and may be sealed together by means of any suitable sealing material.

When the head portion 9 and rearward portion 11 are secured together, they form the complete body of the lure 7 having a top wall 17 and a bottom wall 19. This provides a hollow interior 21 within the body in which a shiftable material 23 may be provided. The shiftable material 23 herein illustrated is a globule of mercury, said globule of mercury being of such dimension that when it is located in the rear end of the tail portion, its width will be less than the average width of the hollow interior of the body, but it is to be understood that any liquid or particles of solid may be employed as the weight shifting medium disposed within the hollow interior 21.

The head portion 9 of the body is substantially flat on the top, as at 24, to produce a planing surface which will cause the lure to tend to dive downwardly as it is drawn through the water. This tendency increases as the speed of movement is increased. The planing surface 24 is preferably provided with an eye 25 to which a line 29 is secured. The eye is positioned with relation to the planing surface and the shape of the body to permit the diving of the body after a predetermined speed of movement has been reached.

The opposite sides of the body may be provided with planing vanes or bosses 31 which tend to assist the action of the planing surface 24 to cause the lure to initially dive and to limit the degree of tilt imparted to the body as the lures advance through the water. These planing vanes or bosses 31 are arched in substantially the same manner as is the body itself, and one-half of each of the planing vanes is molded as a part of each of the molded sections 9 and 11 so that when the two sections are secured together the complete planing vane on each side of the body will be formed. Secured in the rear portion of each of the planing vanes is an eye 33, in each of which a set of hooks 35 is secured. Each of the sets of hooks is balanced as to weight on both sides of the longitudinal center line of the body and disposed below the center of gravity of the longitudinal plane to retain the planing surface 24 positioned upwardly when the lure is in the water. A third set of hooks 37 is secured to the rear end of the body by means of an eye 39 threaded or molded in the rear end portion of the body along the longitudinal center line thereof so that the body will be properly balanced.

The forward end of the head portion 9, as can be seen in Fig. 3, is molded solid, as at 41, to provide a forward wall for the hollow interior 21 which limits the forward movement of the shiftable material 23 within the body so that it will immediately pass to the rear end of the body when the body is on its side and tends to tilt upwardly. This wall is also useful in preventing too slow an action of the shiftable material which might cause the body to turn completely over if drawn at too great a speed through the water. Extending rearwardly from the front wall 41, and upwardly from the bottom wall 19, is a longitudinal rib 43 which is disposed substantially in the center of the front end of the hollow portion 21. The rib 43 causes the shiftable material 23, when the body is in a diving position, to move to one side or the other of the body and thus cause it to turn on its side, as previously described, to produce the darting and wiggling effect of the lure when it is pulled through the water.

It will be noted that the bottom wall 19 of the lure is of less arch from the forward to the rear end than the top wall 17 for the purpose of providing an almost planar surface so that the liquid or shiftable material can readily move thereover from the rearward to the forward end and from one side to the other thereof. With this arrangement, a multiplicity of movements will occur to the lure as it is drawn either at a constant or variable speed through the water. The drawing of the lure through the water at increasing speeds substantially magnifies the movement and increases the variation thereof.

What is claimed is:

1. A fish lure comprising a body having greater length than width including a hollow head portion and a hollow tail portion, one end of each portion being open and having an edge in a plane at other than a right angle to the longitudinal axis of that portion, each portion having lateral projections constituting an integral portion thereof and having their longitudinal axes lying in substantially the same plane, the plane of each projection being substantially parallel to the adjacent plane of the bottom surface of said portion, the head portion having a section of its bottom surface at an obtuse angle to the portion thereof substantially parallel to its projections, the head portion having the front end of its hollow substantially in line with the front end of its projections, the rear end of the hollow of the tail portion having diverging sides merging into a transverse end wall, and a globule of mercury within the hollow of the portions of such dimension that when it is located in the rear end of the tail portion its width will be less than the average width of the hollow portions, said portions being secured together at the open ends along the inclined edges and being provided with line and hook securing means at opposite ends thereof and said projections being provided with hook securing means.

2. A fish lure having a body of greater length than width including head and tail portions each provided with an open pocket in communication with each other, the edges of each pocket lying in planes inclined to the plane of the bottom of each portion, the head having projections on opposite sides thereof integral therewith and substantially parallel to the adjacent rear bottom surface thereof, said projections having rear walls lying in a plane substantially coincident with the plane of the inclined edge of said head portion, said portions being secured to each other along their inclined edges, the pocket of the head portion having its front end substantially in line with the front end of the projection and the tail portion having its pocket provided with diverging walls at the inner end thereof, and a globule of mercury within the pocket of the portions of such dimension that when it is located in the rear end of the tail portion its width will be less than the average width of the pocket, said portions being secured together along the inclined edges and being provided with line and hook securing means at opposite ends thereof and said projections being provided with hook securing means.

3. A fish lure having a body of greater length than width comprising a head portion and a hollow tail portion, said head portion having a solid planing section and a shallow hollow section rearwardly thereof, said hollow tail portion having an unobstructed hollow interior substantially longer than said shallow hollow section of said head portion but of substantially the same cross-sectional area at the adjacent end thereof, the adjacent ends being open and in communication with each other, the bottom wall of said tail portion being substantially flat, the head portion having the bottom surface of the planing section disposed at an obtuse angle to the bottom surface of the shallow hollow section, said bottom surface being flat and disposed in extension of the bottom wall of the tail portion when the head and tail portions are secured together at the adjacent open ends thereof, the rear end of the hollow tail portion having diverging sides defining a pocket, a globule of mercury within the hollow tail portion of such dimension that when it is located in the rear end of the tail portion its width will be less than the average width of the hollow portions so that it is unconfined when moving from said pocket to said shallow hollow section, an eye for a line secured to the solid planing section forwardly of the shallow hollow section, and a hook secured to the tail portion.

4. A fish lure having a body of greater length than width including a head portion and a hollow tail portion, said head portion having a forward solid planing section and a shallow hollow section rearwardly thereof, said hollow tail portion having an unobstructed hollow interior substantially longer than said shallow hollow section of said head portion but of substantially the same cross-sectional area at the adjacent end thereof so as not to interfere with the free passage of a globule of mercury within the hollow of the portions from one portion to the other, the bottom wall of said tail portion being substantially flat, the head portion having the bottom surface of the planing section disposed at an obtuse angle to the bottom surface of the shallow hollow section, said bottom surface being substantially flat and disposed in extension of the bottom surface of the tail portion, the rear end of the hollow tail portion having diverging sides merging into a pocket, a globule of mercury within the hollow tail portion of such dimension that when it is located in the rear end of the tail portion its width will be less than the average width of the hollow portions so that it is unconfined when moving from said pocket to said shallow hollow section, an eye for a line secured to the solid planing section forwardly of the shallow hollow section, and a hook secured to the tail portion.

HOWARD W. POE.

References Cited in the file of this patent

UNITED STATES PATENTS

| Number | Name | Date |
| --- | --- | --- |
| 841,429 | Passage | Jan. 15, 1907 |
| 861,116 | Heddon | July 23, 1907 |
| 956,872 | Alger | May 3, 1910 |
| 1,202,631 | Winnie | Oct. 24, 1916 |
| 1,272,003 | Cameron | July 9, 1918 |
| 1,870,559 | Drake | Aug. 9, 1932 |
| 1,878,015 | Steffensen | Sept. 20, 1932 |
| 2,198,043 | Scogland | Apr. 23, 1940 |
| 2,239,802 | Westby | Apr. 29, 1941 |
| 2,241,767 | Cullerton | May 13, 1941 |
| 2,270,487 | Withey | Jan. 20, 1942 |
| 2,270,488 | Withey | Jan. 20, 1942 |
| 2,503,620 | Larson | Apr. 11, 1950 |